United States Patent
Gao et al.

(10) Patent No.: US 10,547,269 B2
(45) Date of Patent: Jan. 28, 2020

(54) VARIABLE FREQUENCY INDEPENDENT SPEED MOTOR

(71) Applicant: The Boeing Company, Chicago, IL (US)

(72) Inventors: Lijun Gao, Renton, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/982,470

(22) Filed: May 17, 2018

(65) Prior Publication Data
US 2019/0356261 A1  Nov. 21, 2019

(51) Int. Cl.
H02P 27/08 (2006.01)
H02M 7/00 (2006.01)
H02M 7/48 (2007.01)

(52) U.S. Cl.
CPC .......... *H02P 27/085* (2013.01); *H02M 7/003* (2013.01); *H02M 7/4807* (2013.01)

(58) Field of Classification Search
None
See application file for complete search history.

(56) References Cited

U.S. PATENT DOCUMENTS

| | | | | |
|---|---|---|---|---|
| 4,443,748 A * | 4/1984 | Boev | ......................... | H02P 3/22 318/732 |
| 4,625,160 A * | 11/1986 | Hucker | ..................... | H02K 3/16 310/115 |
| 8,963,476 B2 * | 2/2015 | Illiano | ..................... | H02P 9/123 318/700 |
| 2003/0071596 A1 * | 4/2003 | Gokhale | ................. | H02P 27/05 318/727 |
| 2007/0222220 A1 | 9/2007 | Huang et al. | | |

(Continued)

FOREIGN PATENT DOCUMENTS

EP  3487063 A1  5/2019

OTHER PUBLICATIONS

E. Jung, S. Kim, J. Ha and S. Sul, "Control of a Synchronous Motor With an Inverter Integrated Rotor," in IEEE Transactions on Industry Applications, vol. 48, No. 6, pp. 1993-2001, Nov.-Dec. 2012. (Year: 2012).*

(Continued)

*Primary Examiner* — Eduardo Colon Santana
*Assistant Examiner* — Said Bouziane
(74) *Attorney, Agent, or Firm* — Parsons Behle & Latimer

(57) ABSTRACT

An electric motor apparatus may include a rotor and a stator. The apparatus may include a main field motor stage having a set of stator armature windings positioned on the stator and a set of main field windings positioned on the rotor, where the set of stator armature windings is configured to receive a main multiphase power signal from an alternating current power bus having a first current that causes a first rotating magnetic flux that rotates relative to the stator, where the set of main field windings is configured to receive a secondary multiphase power signal having a second current that causes a second rotating magnetic flux that rotates relative to the rotor, and where a combination of the first rotating magnetic flux and the second rotating magnetic flux causes the rotor to turn at a predetermined reference frequency.

20 Claims, 6 Drawing Sheets

(56) References Cited

U.S. PATENT DOCUMENTS

| | | | | |
|---|---|---|---|---|
| 2013/0057195 A1* | 3/2013 | Ha | ............... | H02P 25/26 |
| | | | | 318/812 |
| 2014/0042953 A1* | 2/2014 | Sul | ............... | H02P 27/14 |
| | | | | 318/718 |
| 2015/0035469 A1* | 2/2015 | Rozman | ............... | H02P 6/183 |
| | | | | 318/652 |
| 2015/0115762 A1* | 4/2015 | Rozman | ............... | G01D 5/2066 |
| | | | | 310/180 |
| 2016/0094114 A1* | 3/2016 | Gao | ............... | H02K 3/28 |
| | | | | 310/68 D |
| 2016/0301333 A1* | 10/2016 | Rozman | ............... | H02K 19/365 |
| 2017/0063192 A1* | 3/2017 | Kuznetsov | ............... | H02P 25/22 |

OTHER PUBLICATIONS

F.W. Fuchs "A New Control Method for AC Drives with Inverter-Fed Synchronous Machines Supplied from a Battery" IFAC Control in Power Electronics and Electrical Drives, Sep. 13, 1983.

Eric Eenen Emojong "Design of Inverter Drive for AC Induction Motor" May 20, 2009.

European Patent Office; Office Action; European Patent Application No. 19 169 465.2; Nov. 5, 2019.

European Patent Office; European Search Report; European Patent Application No. 19 169 465.2; Oct. 22, 2019.

\* cited by examiner

VARIABLE FREQUENCY INDEPENDENT SPEED MOTOR

FIELD OF THE DISCLOSURE

This disclosure is generally related to multiphase motors and, in particular, variable frequency independent speed motors.

BACKGROUND

Typical inductive motors include an active set of multiphase windings coupled to the stator and an inactive (or reactive) set of multiphase windings coupled to the rotor. A multiphase power signal is applied to the active set of multiphase windings. The electrical current produced by the multiphase power signal in the active set of windings produces a magnetic field that results in an opposite current in the inactive set of multiphase windings. The opposite current results in an opposing magnetic field that causes the rotor to turn. As the rotor turns, the opposite current within the inactive set of multiphase windings decreases, reducing the magnetic field. The motor eventually settles at an equilibrium speed based on a load attached to the motor and a frequency of the multiphase power signal. The equilibrium speed is generally a frequency that is slightly less than the frequency of the AC power signal. The difference between the frequency of the AC power signal and the rotational frequency of the rotor is known as a slip frequency (or slip angle). In typical systems with a constant load, both the rotational frequency of the rotor and the slip angle are dependent on the frequency of the AC power signal.

In order to achieve an independent rotational frequency, typical motor systems may rely on a rectifier circuit to perform a full-power AC to DC power conversion, then an inverter to perform another full-power DC to AC power conversion with the new AC power signal having the desired frequency, magnitude, and phase. The new AC power signal can then be used to drive an induction motor at the corresponding new frequency. This full-scale power conversion may result significant power losses. Further, the components required to perform the power conversion may add significant weight, which may be undesirable in particular applications, such as within aircraft.

SUMMARY

Disclosed is a variable frequency independent speed motor that overcomes at least one of the shortcomings described above. In an embodiment, an electric motor apparatus includes a high frequency transformer stage for transmitting an excitation signal from the stator to the rotor. The excitation signal may be used to power a set of main field windings positioned on the rotor. Further, an AC power signal may be coupled directly to a set of main field windings positioned on the stator. Both sets of main field windings may be powered with most of the effective power being applied to the set of main field windings positioned on the stator without performing a full-scale power transfer. By generating a current within the set of main field windings positioned on the rotor, the equilibrium speed of the motor may be adjusted to a predetermined speed independent from a frequency of the AC signal.

In an embodiment, an electric motor apparatus includes a rotor and a stator. The apparatus further includes a high frequency transformer stage for transmitting an excitation signal from the stator to the rotor, the high frequency transformer stage having a first set of transformer windings positioned on the stator and a second set of transformer windings positioned on the rotor. The apparatus also includes a main field motor stage having a set of stator armature windings positioned on the stator and a set of main field windings positioned on the rotor, wherein the set of stator armature windings is configured to receive a main multiphase power signal from an alternating current power bus having a first current that causes a first rotating magnetic flux that rotates relative to the stator, where the set of main field windings is configured to receive a secondary multiphase power signal having a second current that causes a second rotating magnetic flux that rotates relative to the rotor, where a combination of the first rotating magnetic flux and the second rotating magnetic flux causes the rotor to turn at a predetermined reference frequency.

In some embodiments, the apparatus includes a rectifier coupled to the rotor and electrically connected to the second set of transformer windings, the rectifier configured to rectify the excitation signal to generate a direct current power signal, and an inverter coupled to the rotor and electrically connected to the rectifier, where the inverter is configured to modulate the direct current power signal to generate the secondary multiphase power signal. In some embodiments, the apparatus includes an encoder, and an embedded controller circuit coupled to the rotor, the embedded controller circuit configured to: generate an electric phase signal based on the main multiphase power signal; receive a rotor phase signal from the encoder; generate a combination phase signal based on a difference between the electric phase signal and the rotor phase signal; and generate pulse-width modulation signals based on the combination phase signal to control the inverter to cause the secondary multiphase power signal to have a frequency, magnitude, and phase that enables the first rotating magnetic flux and the second rotating magnetic flux to combine to turn the rotor at the predetermined reference frequency.

In some embodiments, the apparatus includes a control signal coupler having a first portion disposed on the stator and a second portion disposed on the rotor, where the control signal coupler is an optical, non-contacting coupler, and where the embedded controller circuit is configured to receive one or more control signals from a controller circuit of a motor control unit via the control signal coupler. In some embodiments, the embedded controller is further configured to: receive a reference frequency signal from a motor control unit, the reference frequency signal representing the predetermined reference frequency; generate a Q-axis current signal based on the reference frequency signal and a rotor frequency signal; generate a Q-axis voltage signal based on the Q-axis current signal and a Q-axis feedback current signal; receive a D-axis reference current signal from the motor control unit; generate a D-axis current signal based on the D-axis reference current signal and a D-axis feedback current signal; and generate an alpha-beta voltage signal by applying the combination phase signal in an inverse-Park transform using the Q-axis voltage signal and the D-axis current signal as inputs to the inverse-park transform, where the pulse-width modulation signals are derived from the alpha-beta voltage signal at a pulse-width modulation generator circuit.

In some embodiments, the embedded controller is further configured to: receive a rotor feedback current signal from the set of stator armature windings; generate an alpha-beta current feedback signal by applying a Clarke transformation using the rotor feedback current signal as an input to the Clark transformation; and generate the D-axis feedback current signal and the Q-axis feedback current signal by applying the combination phase signal in a Park transformation using the alpha-beta current feedback signal as an input to the Park transformation.

In some embodiments, the set of stator armature windings is coupled directly to the second set of transformer windings and is configured to receive the secondary multiphase power signal from the second set of windings. In some embodiments, the excitation signal includes a high frequency modulation signal component and a secondary multiphase power component, where an inductance at the second set of transformer windings and the set of stator armature windings filters the high frequency modulation signal component to form the secondary multiphase power signal. In some embodiments, the predetermined reference frequency of the rotor is independent from a frequency of the main multiphase power signal. In some embodiments, the first set of transformer windings, the second set of transformer windings, the set of main field windings, and the set of stator armature windings each include three windings for operation with 3-phase power signals. In some embodiments, a frequency of the excitation signal is between about 1 kHz to 1 MHz.

In an embodiment, a system includes a motor control unit and a motor. The motor includes a rotor and a stator. The system includes a high frequency transformer stage for transmitting an excitation signal from the stator to the rotor, the high frequency transformer stage having a first set of transformer windings positioned on the stator and a second set of transformer windings positioned on the rotor. The system further includes a main motor stage having a set of stator armature windings positioned on the stator and a set of main field windings positioned on the rotor, where the set of main field windings is configured to receive a main multiphase power signal from an alternating current power bus having a current that causes a first rotating magnetic flux that rotates relative to the stator, where the set of stator armature windings is configured to receive a secondary multiphase power signal having a current that causes a second rotating magnetic flux that rotates relative to the rotor, where a combination of the first rotating magnetic flux and the second rotating magnetic flux causes the rotor to turn at a predetermined reference frequency.

In some embodiments, the motor control unit includes a rectifier configured to rectify the main multiphase power signal from the alternating current bus to generate a direct current power signal, a controller circuit, and a frequency converter including an inverter, where the controller circuit is configured to control the frequency converter to modulate the direct current power signal to generate the excitation signal. In some embodiments, the controller circuit is configured to further control the inverter to cause the excitation signal to include a high frequency modulation signal component and a secondary multiphase power component, where an inductance at the second set of transformer windings and the set of stator armature windings filters the high frequency modulation signal component to form the secondary multiphase power signal, and where the controller circuit is configured to control the inverter to generate the secondary multiphase power signal to have a frequency, magnitude, and phase that causes the combination of the first rotating magnetic flux and the second rotating magnetic flux to turn the rotor at the predetermined reference frequency.

In some embodiments, the controller circuit is configured to: generate an electric phase signal based on the main multiphase power signal; receive a rotor phase signal from an encoder; generate a combination phase signal based on a difference between the electric phase signal and the rotor phase signal; and generate pulse-width modulation signals based on the combination phase signal to control the inverter to cause the secondary multiphase power signal to have a frequency, magnitude, and phase that enables the first rotating magnetic flux and the second rotating magnetic flux to combine to turn the rotor at the predetermined reference frequency.

In some embodiments, the controller circuit is further configured to: receive a reference frequency signal, the reference frequency signal representing the predetermined reference frequency; generate a Q-axis current signal based on the reference frequency signal and a rotor frequency signal; generate a Q-axis voltage signal based on the Q-axis current signal and a Q-axis feedback current signal; receive a D-axis reference current signal; generate a D-axis current signal based on the D-axis reference current signal and a D-axis feedback current signal; and generate an alpha-beta voltage signal by applying the combination phase signal in an inverse-Park transform using the Q-axis voltage signal and the D-axis reference signal as inputs to the inverse-park transform, where the pulse-width modulation signals are derived from the alpha-beta voltage signal.

In some embodiments, the controller circuit is configured to: filter the excitation signal to retrieve a rotor feedback current signal; generate an alpha-beta current feedback signal by applying a Clarke transformation using the rotor feedback current signal as an input to the Clark transformation; and generate the D-axis feedback current signal and the Q-axis feedback current signal by applying the combination phase signal in a Park transformation using the alpha-beta current feedback signal as an input to the Park transformation.

In an embodiment, a method includes receiving a main multiphase power signal at a set of main field windings coupled to a stator of a motor apparatus, the main multiphase power signal having a current that causes a first rotating magnetic flux that rotates relative to the stator. The method further includes receiving a secondary multiphase power signal at a set of stator armature windings coupled to a rotor of the motor apparatus, the secondary multiphase power signal having a current that causes a second rotating magnetic flux that rotates relative to the rotor. The method also includes generating an electric phase signal based on the main multiphase power signal. The method includes receiving a rotor phase signal from an encoder configured to monitor rotation of the rotor. The method includes generating a combination phase signal based on a difference between the electric phase signal and the rotor phase signal. The method further includes generating pulse-width modulation signals based on the combination phase signal to control an inverter to cause the secondary multiphase power signal to have a frequency, magnitude, and phase that enables the first rotating magnetic flux and the second rotating magnetic flux to combine to turn the rotor at a predetermined reference frequency.

In some embodiments, the predetermined reference frequency of the rotor is independent from a frequency of the main multiphase power signal. In some embodiments, the method includes transferring an excitation signal from the stator to the rotor using a high frequency transformer stage that includes a first set of transformer windings coupled to the stator and a second set of transformer windings coupled to the rotor, and powering the secondary multiphase power signal using the excitation signal.

Figure 1:
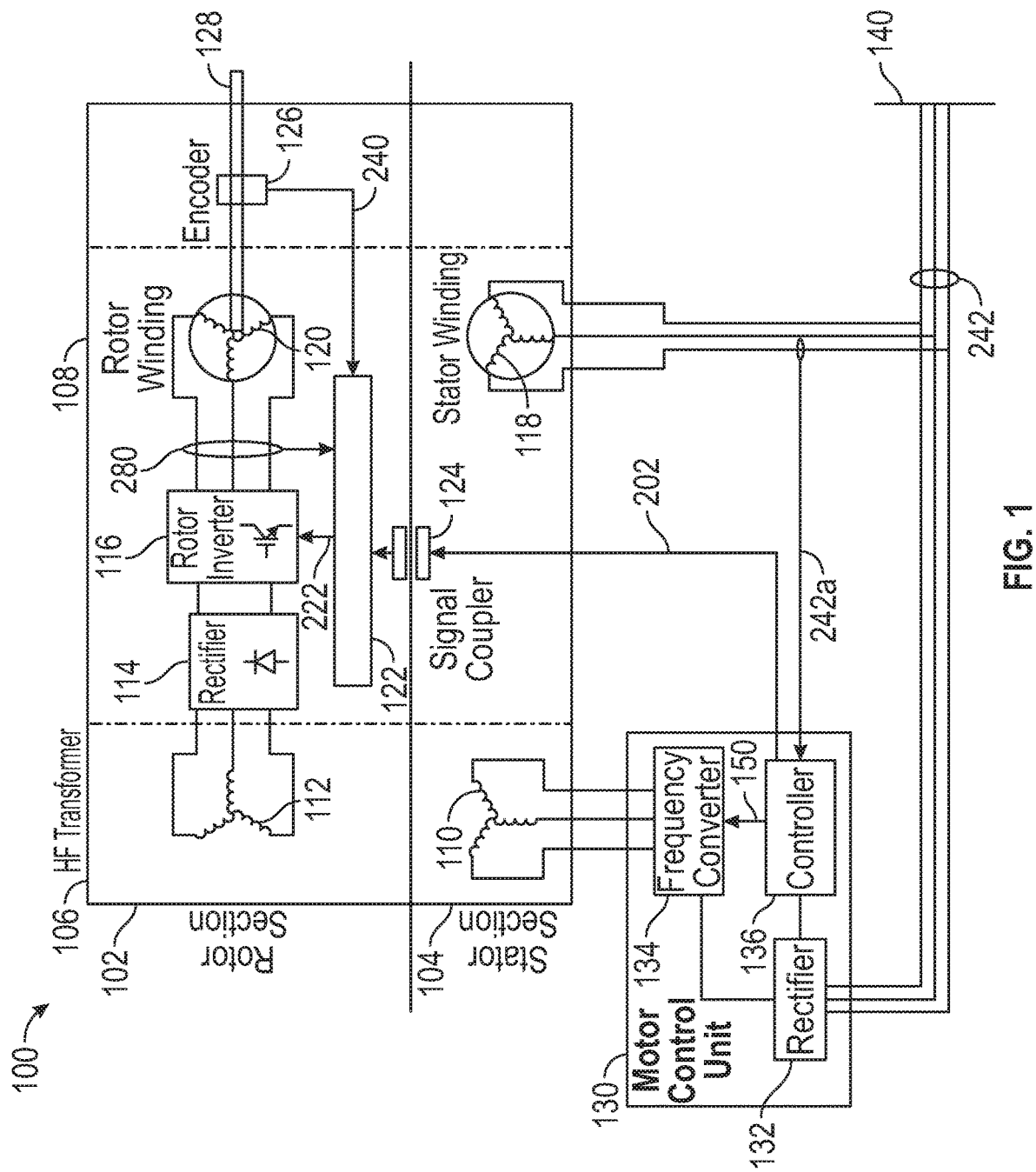
FIG. 1 is a block diagram depicting an embodiment of a variable frequency independent speed motor system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an embodiment of a variable frequency independent speed motor system 100 is depicted. The system 100 may include a rotor 102 and a stator 104. The system may further include a high frequency transformer stage 106 and a main field stage 108.

The high frequency transformer stage 106 may include a first set of transformer windings 110 and a second set of transformer windings 112. The first set of transformer windings 110 may be coupled to and positioned on the stator 104 and the second set of transformer windings 112 may be coupled to and positioned on the rotor 102. The first set of transformer windings 110 and the second set of transformer windings 112 may include 3-phase windings for transmitting an excitation signal from the stator 104 to the rotor 102.

As used herein high frequency means that a frequency of the signal is greater than the rotational frequency of the rotor 102. For example, as a frequency of an excitation signal to be transmitted from the first set of transformer windings 110 to the second set of transformer windings 112 increases, the effects of the rotation of the rotor 102 become less significant. This may enable the excitation signal to be transmitted without significant interference or power losses caused by the rotation of the rotor 102. Further, the high frequency transformer stage 106 may omit contact power transmission mechanisms between the stator 104 and the rotor 102. For example, while typical power transmission mechanisms may include a slip ring, or similar contact power transmission mechanism, the system 100 may omit these contact mechanisms. By eliminating contact power transmission mechanisms between the stator 104 and the rotor 102, performance issues, such as arcing, wearing, and contact resistance may be avoided. This may result in greater reliability, lower maintenance costs, less downtime, and reduced power loss. Other advantages may exist.

The main field stage 108 may include a rectifier 114 and an inverter 116 coupled to and positioned on the rotor 102. The rectifier 114 may be configured to rectify the high frequency excitation signal to generate a DC power signal. For example, the rectifier 114 may be a 3-phase diode-type rectifier. The inverter 116 may include multiple switches for modulating the DC power signal as described herein.

The main field stage 108 may further include a set of stator armature windings 118 coupled to and positioned on the stator 104 and a set of main field windings 120 coupled to and positioned on the rotor 102. The set of stator armature windings 118 may be coupled to an AC power bus 140 and configured to receive a multiphase power signal 242 from the AC power bus 140. The multiphase power signal 242 may be a 3-phase power signal. The set of main field windings 120 may be coupled to an output of the inverter 116 and configured to receive a secondary multiphase power signal 280 from the inverter 116.

The main field stage 108 may include an embedded controller circuit 122 coupled to and positioned at least partially on the rotor 102. The embedded controller circuit 122 may include logic circuitry in order to control the inverter 116, as described herein, to generate the secondary multiphase power signal 280 to have a predetermined frequency, magnitude, and phase. Alternatively or additionally, the embedded controller circuit 122 may include a processor and corresponding memory configured to control the inverter 116 as described herein.

The system 100 may further include a signal coupler 124 to pass control signals, such as a reference frequency signal 202 described further herein, from the stator 104 to the rotor 102 without making physical contact. The signal coupler 124 may have a first portion disposed on the stator 104 and a second portion disposed on the rotor 102 and may include an optical link. As such, the signal coupler 124 may be a non-contacting coupler in order to produce less friction as compared to contact signal couplers.

The rotor 102 may include a shaft 128 coupled to the rotor 102 for transferring mechanical power to an external system. For example, the shaft 128 may provide rotational power for a propulsion system of an aircraft or other vehicle. An encoder 126 may monitor rotation of the shaft 128 and may produce a rotor phase signal 240 indicating a position of the shaft 128.

The system 100 may include a motor control unit 130. The motor controller unit 130 may be external to the rotor 102 and the stator 104. Further, the motor controller unit 130 may be located remote from the other portions of the system 100. The motor control unit 130 may include a rectifier 132, a frequency converter 134, and a controller circuit 136.

The rectifier 132 may be coupled to the AC bus 140 and configured to generate a DC power signal for use by the frequency converter 134 in generating the excitation signal and to power the controller circuit 136. The controller circuit 136 may be configured to control multiple switches within the frequency converter 134 in order to produce the excitation signal. For example, the frequency converter 134 may include a power modulator circuit (not shown).

The controller circuit 136 may be implemented as logic circuitry in order to control the frequency converter 134. Alternatively or additionally, the controller circuit 136 may include a processor and corresponding memory configured to control the frequency converter 134. For example, in some embodiments, the controller circuit 136 may include a central processing unit (CPU), a graphical processing unit (GPU), a digital signal processor (DSP), a peripheral interface controller (PIC), another type of microprocessor, and/or combinations thereof. The controller circuit 136 may be implemented as an integrated circuit, a field programmable gate array (FPGA), an application specific integrated circuit (ASIC), a combination of logic gate circuitry, other types of digital or analog electrical design components, or combinations thereof.

During operation, the AC bus 140 may provide a main multiphase power signal 242 to the set of stator armature windings 118. The AC bus 140 may simultaneously provide the main multiphase power signal 242 to the rectifier 132 of the motor control unit 130.

The rectifier 132 may rectify the main multiphase power signal 242 to generate a DC power signal for powering the frequency converter 134 and the controller circuit 136. The controller circuit 136 may send a signal 150 to the frequency converter 134 to control the frequency converter 134 to use the DC power signal to generate a high frequency excitation signal that may be transmitted to the first set of transformer windings 110. A frequency of the excitation signal may be between about 1 kHz to 1 MHz.

The first set of transformer windings 110 may transmit the high frequency excitation signal to the second set of transformer windings 112 and the rectifier 114 may convert the high frequency excitation signal to a DC power signal, which may be used by the inverter 116. The controller circuit 136 may monitor a phase 242a of the main AC power signal 242 on the AC bus 140. The controller circuit 136 may further transmit control signals, such as a reference frequency signal 202, including a signal indicating the electric phase of the main AC power signal 242, to the control the embedded controller circuit 122 via the signal coupler 124. The embedded controller circuit 122 may further receive a rotor phase signal 240 from the encoder 126 and a signal indicating a current associated with the secondary multiphase power signal 280 based on the output of the inverter 116.

Based on the control signals and the feedback signals, the embedded controller circuit 122 may control the inverter 116 using pulse-width modulation signals 222 to generate the secondary multiphase power signal 280 that may be applied to the set of main field windings 120.

By applying the AC power signal from the AC bus 140 to the set of stator armature windings 118 without performing a full power conversion, the system 100 may be more efficient than typical induction motors that rely on rectification and modulation between a power bus and the input of a main stage. Further, by actively applying a secondary multiphase power signal 280 to the set of main field windings 120, the rotor may be set to rotate at a predetermined frequency that is independent of a frequency of the multiphase power signal on the AC bus 140. As such, the system 100 may achieve independent speed of the rotor 102 more efficiently by applying most (e.g., 90%) of the effective power of the power signal on the AC bus 140 directly to the set of stator armature windings 118. The rest (e.g., 10%) of the effective power may transmitted to the rotor 102, independently converted, and applied to the set of main field windings 120 to achieve a rotational frequency that is independent from the frequency of the multiphase power signal on the AC bus 140. Other advantages of the system 100 may exist.

Figure 2:
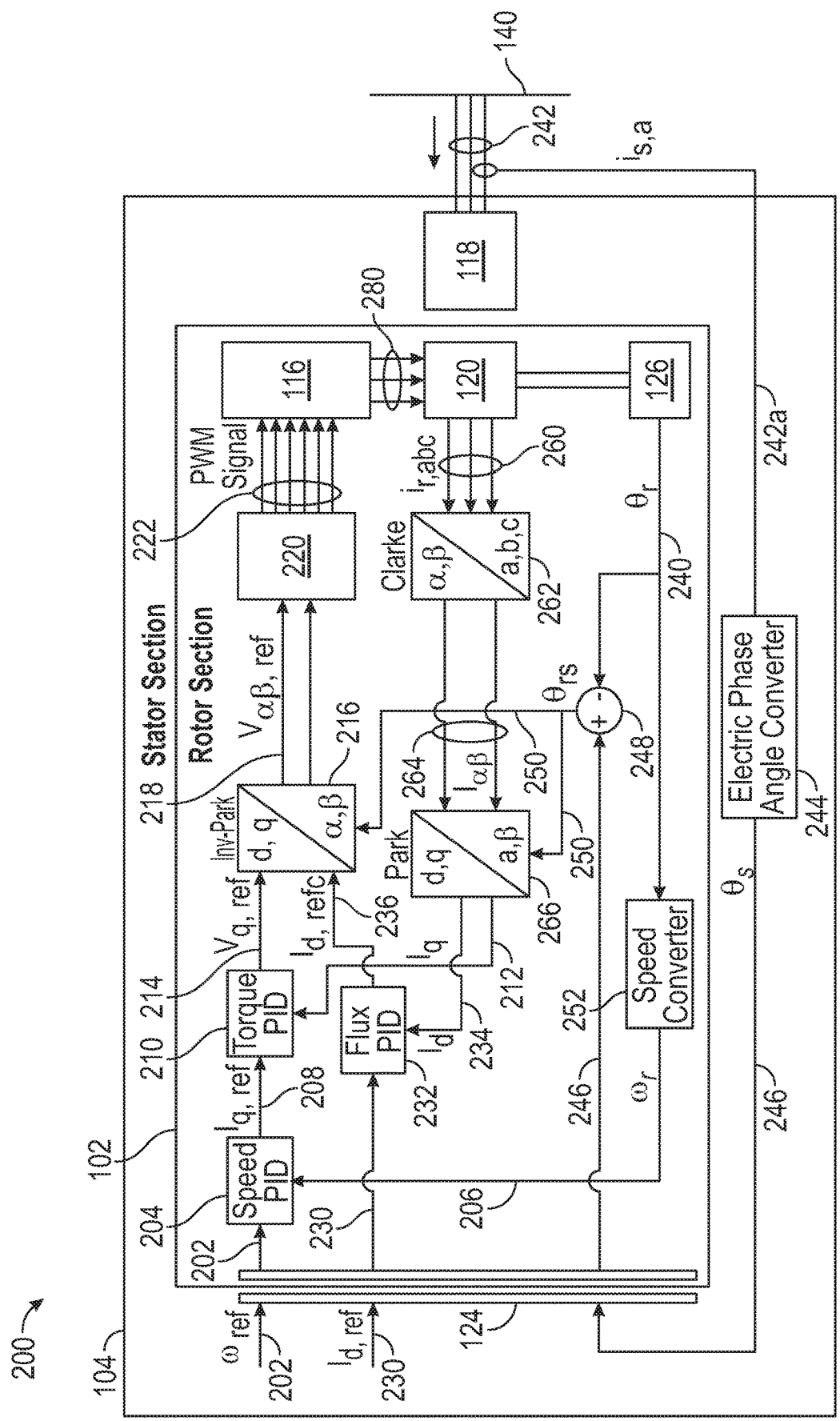
FIG. 2 is a block diagram depicting an embodiment of a control system for a variable frequency independent speed motor system.

Referring to FIG. 2, a control system 200 for a variable frequency independent speed motor system is depicted. Portions of the control system 200 may be positioned on the stator 104 and other portions may be positioned on the rotor 102. Further, FIG. 2 describes the functions of the embedded controller circuit 122. The described functions may be performed by logic circuitry, by a processor coupled with a memory having instructions that cause the processor to perform the functions, or by any combination thereof. It should be noted that for each of the signals described herein, a separate signal may be generated for each phase of a multiphase power system.

The control system 200 may receive a reference frequency signal 202 via the signal coupler 124. In some embodiments, the reference frequency signal 202 may be received from the controller circuit 136 of FIG. 1. Alternatively, the reference frequency signal 202 may be set by a user or may be hardcoded into the controller circuit 136.

The control system 200 may include a speed proportional-integral-derivative (PID) 204. The speed PID 204 may receive the reference frequency signal 202 and a rotor frequency signal 206, which is described further herein. Based on the reference frequency signal 202 and the rotor frequency signal 206, the speed PID 204 may generate a quadrature axis (Q-axis) current signal 208.

The control system 200 may further include a torque PID 210. The torque PID 210 may receive the Q-axis current signal 208 and a Q-axis feedback current signal 212, which is described further herein. Based on the Q-axis current signal 208 and the Q-axis feedback current signal 212, the torque PID 210 may generate a Q-axis voltage signal 214.

The control system 200 may further include an inverse-Park circuit 216. The inverse-Park circuit 216 may receive the Q-axis voltage signal as well as a direct axis (D-axis) current signal 236 and a combination phase signal 250 (which are described further herein). The combination phase signal 250 may be applied in an inverse-Park transform to transform the Q-axis voltage signal 214 and the D-axis current signal 236 into an alpha-beta voltage signal 218.

The system 200 may include a pulse-width modulation generator 220 that may receive the alpha-beta voltage signal 218 and use it to derive pulse-width modulation signals 222 that drive the inverter 116. The inverter may then generate a secondary multiphase power signal 280 that drives the set of main field windings 120.

The set of stator armature windings 118 may be driven by an AC bus 140 causing a first rotating magnetic field. The set of main field windings 120 may be driven by a secondary multiphase power signal 280 generated at the inverter 116 and causing a second rotating magnetic field. The combination of the first rotating magnetic flux and the second rotating magnetic flux may cause the rotor to turn at the predetermined reference frequency indicated by the reference frequency signal 202. The predetermined reference frequency may be independent from a frequency of the multiphase power signal on the AC bus 140.

Regarding the rotor frequency signal 206, an encoder 126 may monitor the mechanical rotation of the rotor 102 and generate a rotor phase signal 240. The system 200 may include a speed converter 252 that receives the rotor phase signal 240 and converts it to the rotor frequency signal 206. For example, the speed converter 252 may determine the time required for the rotor phase indicated by the rotor phase signal 240 to complete one full rotation (i.e., the period associated with the rotor 102) and determine the frequency of the rotor frequency signal 206 using the time taken for one full rotation.

Regarding the combination phase signal 250, the system 200 may include an electric phase angle converter 244. The electric phase angle converter 244 may monitor a phase 242a of the multiphase power signal 242 on the AC bus 140 and, by determining a period associated with a phase of the multiphase power signal, the electric phase angle converter 244 may generate an electric phase signal 246.

The system 200 may include a combination circuit 248. For example, the combination circuit 248 may be a phase addition/subtraction circuit. Likewise, as explained herein, the combination circuit 248 may be a processor and memory programmed for performing addition and subtraction functions. The combination circuit 248 may generate the combination phase signal 250 by determining a difference between the rotor phase signal 240 and the electric phase signal 246.

Regarding the D-axis current signal 236, the system 200 may receive a D-axis reference current signal 230 via the signal coupler 124. The D-axis reference current signal 230 may be received from the controller circuit 136 of FIG. 1 and may be set by a user, may be hardcoded into the controller circuit 136, or may be calculated based on a desired power output of the rotor 102.

The system 200 may include a flux PID 232. The flux PID 232 may receive the D-axis reference current signal 230 and a D-axis feedback current signal 234, which is described further herein. The flux PID 232 may generate the D-axis current signal 236 using the D-axis reference current signal 230 and the D-axis feedback current signal 234.

Regarding the D-axis feedback current signal 234 and the Q-axis feedback current signal 212, the system 200 may include a Clarke transform circuit 262. A current signal 260 for each phase of the set of main field windings 120 may be transformed to generate an alpha-beta current signal 264.

The system 200 may include a Park transform circuit 266 that receives the alpha-beta current signal 264 and the combination phase signal 250. The D-axis feedback current signal 234 and the Q-axis feedback current signal 212 may be generated by applying the combination phase signal 250 to the Park transform with the alpha-beta current signal 264 as an input.

Any of the circuits and/or modules of the system 200 may be combined and may share logic circuitry. Further, any of the circuits and/or modules of the system 200 may include a processor, or may share a processor, to perform the functions described with reference to each circuit and/or module.

A benefit of the control system 200 is that it may enable pulse with modulation control signals to be generated that control the inverter 116 to generate a secondary multiphase power signal that, when applied to the set of main field windings 120, creates a second rotating magnetic field that, when combined with the first rotating magnetic field generated by the set of stator armature windings 118, causes the rotor 102 to rotate at a predetermined reference frequency indicated by the reference frequency signal 202. The predetermined reference frequency may be independent from a frequency of the multiphase power signal on the AC bus 140. Other advantages may exist.

Figure 3:
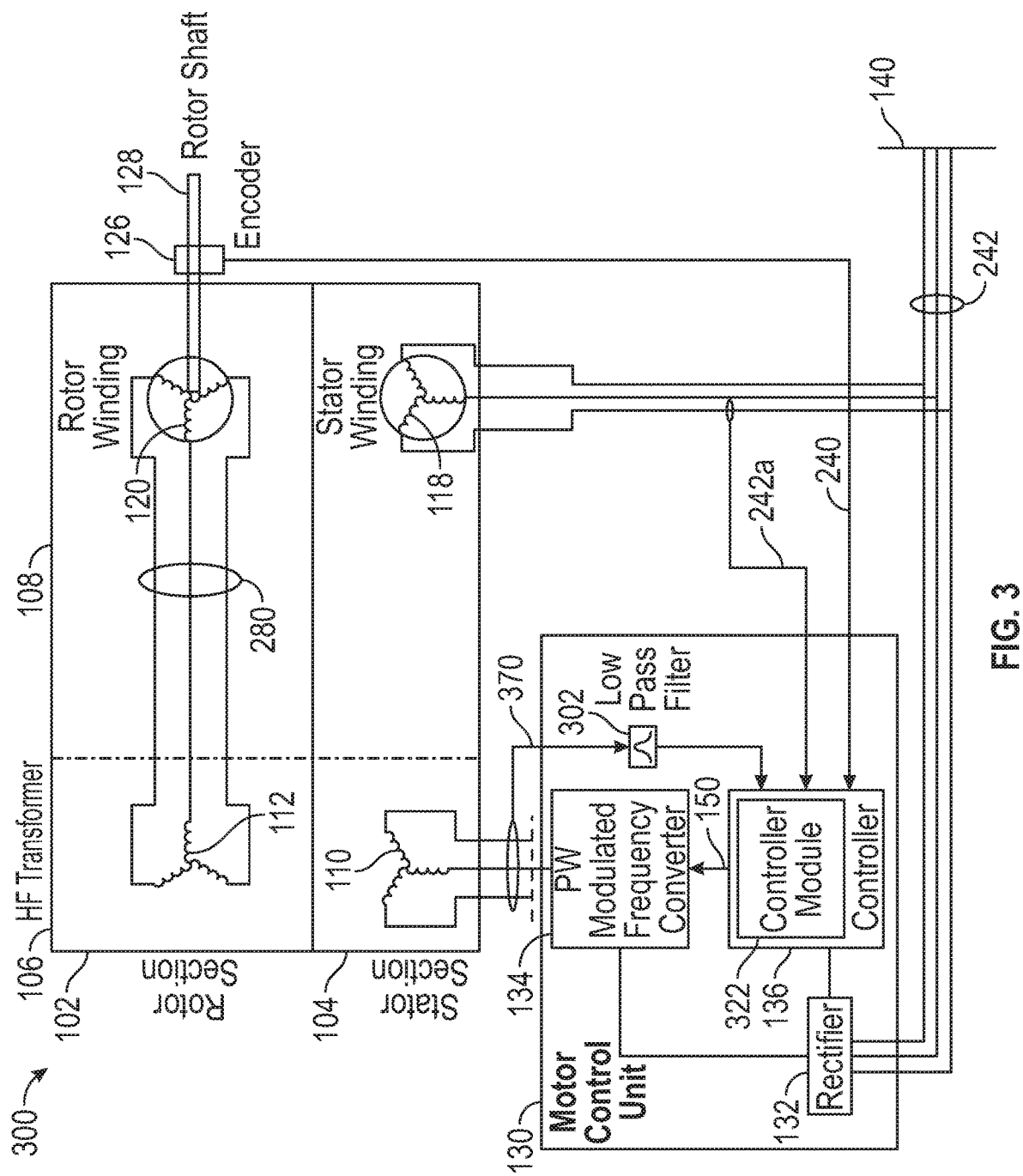
FIG. 3 is a block diagram depicting an embodiment of a variable frequency independent speed motor system.

Referring to FIG. 3, an embodiment of a variable frequency independent speed motor system 300 is depicted. As in FIG. 1, the system 300 may include a rotor 102 and a stator 104 with a high frequency transformer stage 106 and a main field stage 108. The high frequency transformer stage 106 may include a first set of transformer windings 110 and a second set of transformer windings 112. The main field stage 108 may include a set of stator armature windings 118 and a set of main field windings 120. The rotor 102 may be coupled with a rotor shaft 128 and an encoder 126 may be configured to monitor rotation of the motor shaft 128. An AC power bus 140 may provide a multiphase power signal to power the system 300.

The system 300 may differ from the system 100 in that the second set of transformer windings 112 may be coupled directly to the set of main field windings 120. As used herein, the term "coupled directly" means that there is no intervening rectifier circuit or inverter circuit between the second set of transformer windings 112 and the set of main field windings 120.

The system 300 may further include a motor control unit 130. The motor control unit 130 may include a rectifier 132, a frequency converter 134, and a controller circuit 136. The controller circuit 136 may include a controller module 322 that performs functions for controlling the frequency converter 134 via a control signal 150. The controller module 322 may be implemented as logic circuitry or as a processor and memory programmed for performing the functions described herein.

During operation, the AC bus 140 may provide a main multiphase power signal 242 to the first set of main windings 118. The AC bus 140 may simultaneously provide the main multiphase power signal 242 to the rectifier 132 of the motor control unit 130. The rectifier 132 may rectify the main multiphase power signal to generate a DC power signal for powering the frequency converter 134 and the controller circuit 136. The controller circuit 136 may control the frequency converter 134 to use the DC power signal to generate a high frequency excitation signal that may be transmitted to the first set of transformer windings 110.

The excitation signal may include a high frequency modulation component and a secondary multiphase power signal component. The secondary multiphase power signal component may be generated based on feedback signals, such as a phase 242a of the multiphase power signal 242, the rotor phase signal 240, and a feedback high frequency excitation signal 370, provided to the controller module 322 of the controller circuit 136. For example, the motor control unit 130 may include a low pass filter 302. The low pass filter 302 may be used to filter each phase of the excitation signal to provide a feedback current signal. The feedback current signal may be representative of a current that will be applied to the set of main field windings 120. The controller module 322 may further receive a rotor phase signal from the encoder 126 and a signal indicating the electric phase of the main AC power signal from the AC bus 140. Based on these feedback signals, the frequency converter 134 may be controlled by the controller circuit 136 to generate the high frequency excitation signal.

The first set of transformer windings 110 may transmit the high frequency excitation signal to the second set of transformer windings 112. An inductance between second set of transformer windings 112 and the set of main field windings 120 may filter the high frequency modulation component from the high frequency excitation signal resulting in a remaining secondary multiphase power signal 280 that may actively drive the set of main field windings 120.

As the main multiphase power signal from the AC bus 140 is applied to the set of stator armature windings 118, a first rotating magnetic flux may be generated at the set of main field windings 118. As the secondary multiphase power signal 280 is applied to the set of main field windings 120, a second rotating magnetic flux may be generated that, when combined with the first rotating magnetic flux, causes the rotor 102 to rotate at a predetermined reference frequency. Because a frequency of the rotation of the rotor 102 is based on a combination of the first rotating magnetic flux and the second rotating magnetic flux, the frequency of the rotor 102 may be independent from a frequency of the main multiphase power signal on the AC bus 140.

An advantage of the system 300 is that the rotor 102 may rotate at an independent frequency while also enabling a direct power transfer from the AC bus 140 to the set of stator armature windings 118. This may enable the system 300 to be more efficient as compared to typical AC motors configured to run at frequencies that are independent from AC power busses that power them, which may rely on full-scale power conversions between main stage windings and the AC bus. Further, the system 300 may omit complex circuitry on the rotor 102 by generating the secondary multiphase power signal within the motor control unit 130 and subsequently transmitting the secondary multiphase power signal to the rotor 102 as a component of the high frequency excitation signal generated by the frequency converter 134.

Figure 4:
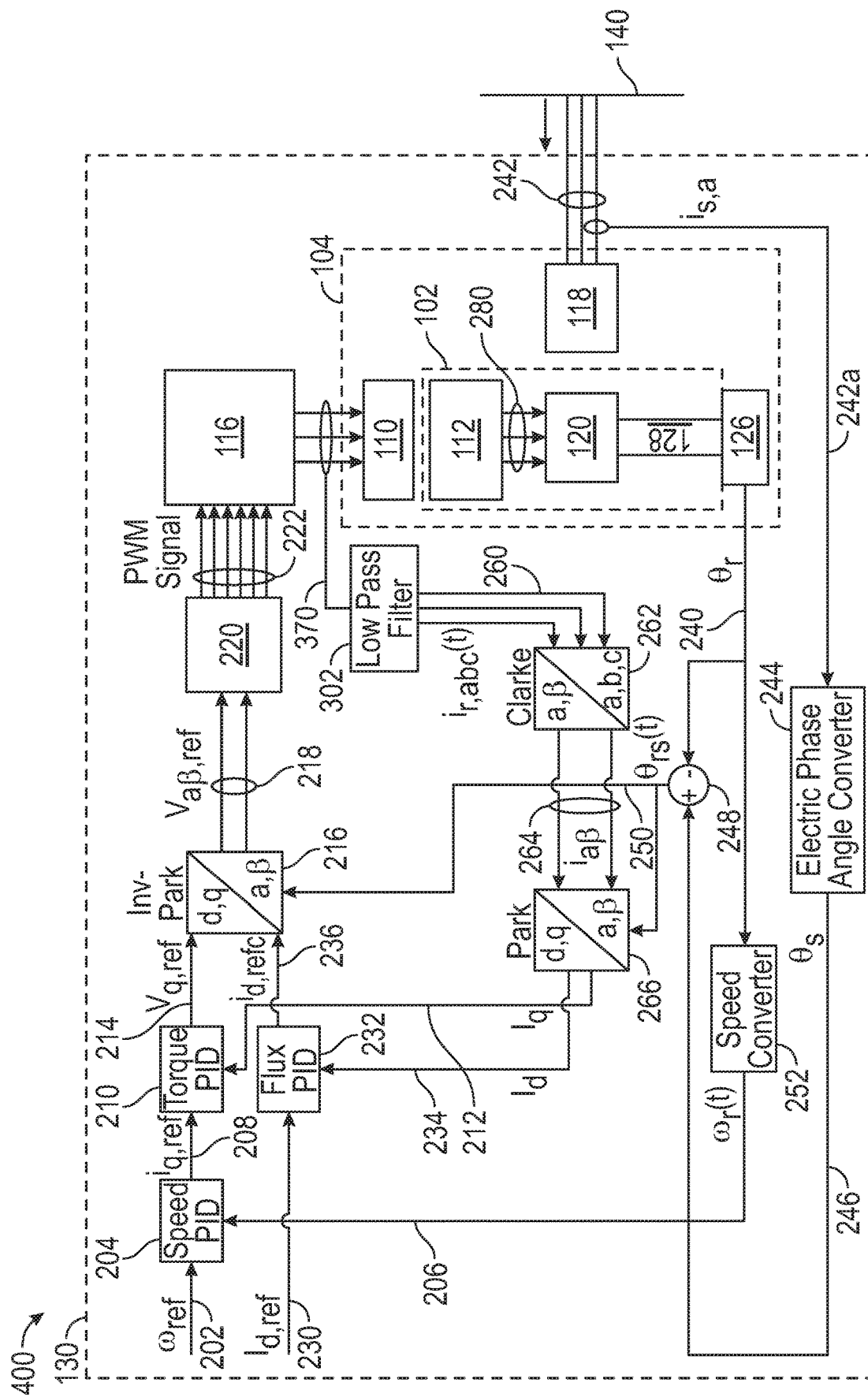
FIG. 4 is a block diagram depicting an embodiment of a control system for a variable frequency independent speed motor system.

Referring to FIG. 4, a control system 400 for a variable frequency independent speed motor system is depicted. The majority of the control system 400 may be positioned external to the rotor 102 and the stator 104. For example, portions of the control system 400 may be positioned within the controller module 322 within the controller circuit 136. Further, the described functions may be performed by logic circuitry, by a processor coupled with a memory having instructions that cause the processor to perform the functions, or by any combination thereof. It should be noted that for each of the signals described herein, a separate signal may be generated for each phase of a multiphase power system.

The control system 400 may receive a reference frequency signal 202. The reference frequency signal 202 may be set by a user, generated by the controller circuit 136, or may be hardcoded into the controller circuit 136.

The control system 200 may include a speed PID 204. The speed PID may receive the reference frequency signal 202 and a rotor frequency signal 206, which is described further herein. Based on the reference frequency signal 202 and the rotor frequency signal 206, the speed PID 204 may generate a Q-axis current signal 208.

The control system 400 may further include a torque PID 210. The torque PID 210 may receive the Q-axis current signal 208 and a Q-axis feedback current signal 212, which is described further herein. Based on the Q-axis current signal 208 and the Q-axis feedback current signal 212, the torque PID 210 may generate a Q-axis voltage signal 214.

The control system 400 may also include an inverse-Park circuit 216. The inverse-Park circuit 216 may receive the Q-axis voltage signal as well as a D-axis current signal 236 and a combination phase signal 250 (which are described further herein). The combination phase signal 250 may be applied in an inverse-Park transform to transform the Q-axis voltage signal 214 and the D-axis current signal 236 into an alpha-beta voltage signal 218.

The system 400 may include a pulse-width modulation generator 220 that may receive the alpha-beta voltage signal 218 and use it to derive pulse-width modulation signals 222 that drive the inverter 116. The inverter 116 may then generate an excitation signal including a secondary multiphase power signal component that may be transferred from the stator 104 to the rotor 102 via the high frequency transformer windings 110, 112. An extracted secondary multiphase power signal 280 may then drive the set of main field windings 120.

The set of stator armature windings 118 may be driven by an AC bus 140 causing a first rotating magnetic field. The set of main field windings 120 may be driven by secondary multiphase power signal 280, causing a second rotating magnetic field. The combination of the first rotating magnetic flux and the second rotating magnetic flux may cause the rotor 102 to turn at the predetermined reference frequency indicated by the reference frequency signal 202. The predetermined reference frequency may be independent from a frequency of the multiphase power signal on the AC bus 140.

Regarding the rotor frequency signal 206, an encoder 126 may monitor the mechanical rotation of the rotor 102 and generate a rotor phase signal 240. The system 200 may include a speed converter 252 that receives the rotor phase signal 240 and converts it to the rotor frequency signal 206. For example, the speed converter 252 may determine the time required for the rotor phase indicated by the rotor phase signal 240 to complete one full rotation (i.e., the period associated with the rotor 102) and determine the frequency of the rotor frequency signal 206 using the time taken for one full rotation.

Regarding the combination phase signal 250, the system 200 may include an electric phase angle converter 244. The electric phase angle converter 244 may monitor the multiphase power signal on the AC bus 140 and by determining a period associated with a single phase 242a of the multiphase power signal 242, the electric phase angle converter 244 may generate an electric phase signal 246.

The system 400 may include a combination circuit 248. For example, the combination circuit 248 may be a phase addition/subtraction circuit. Likewise, as explained herein, the combination circuit 248 may be a processor and memory programmed for performing addition and subtraction functions. The combination circuit 248 may generate the combination phase signal 250 by determining a difference between the rotor phase signal 240 and the electric phase signal 246.

Regarding the D-axis current signal 236, the system 200 may receive a D-axis reference current signal 230. The D-axis reference current signal 230 may be received from the controller circuit 136 of FIG. 1 and may be set by a user, may be hardcoded into the controller circuit 136, or may be calculated based on a desired power output of the rotor 102.

The system 400 may include a flux PID 232. The flux PID 232 may receive the D-axis reference current signal 230 and a D-axis feedback current signal 234, which is described further herein. The flux PID 232 may generate the D-axis current signal 236 using the D-axis reference current signal 230 and the D-axis feedback current signal 234.

Regarding the D-axis feedback current signal 234 and the Q-axis feedback current signal 212, the system 200 may include a Clarke transform circuit 262. A current signal 260 for each phase of the set of main field windings 120 may be transformed to generate an alpha-beta current signal 264. In order to generate the current signal 260, the system 400 may include a low pass filter 302 to extract the secondary multiphase power signal 280 from the excitation signal 370. This differs from the system 200, which measures the secondary multiphase power signal 280 directly as it is applied to the set of main field windings 120.

The system 400 may include a Park transform circuit 266 that receives the alpha-beta current signal 264 and the combination phase signal 250. The D-axis feedback current signal 234 and the Q-axis feedback current signal 212 may be generated by applying the combination phase signal 250 to the Park transform circuit 266 with the alpha-beta current signal 264 as an input.

Any of the circuits and/or modules of the system 200 may be combined and may share logic circuitry. Further, any of the circuits and/or modules of the system 200 may include a processor, or may share a processor, to perform the functions described with reference to each circuit and/or module.

A benefit of the control system 400 is that it may enable pulse with modulation control signals to be generated that control the inverter 116 to generate a secondary multiphase power signal 280 that, when applied to the set of main field windings 120, creates a second rotating magnetic field that, when combined with the first rotating magnetic field generated by the set of stator armature windings 118, causes the rotor 102 to rotate at a predetermined reference frequency indicated by the reference frequency signal 202. The predetermined reference frequency may be independent from a frequency of the multiphase power signal on the AC bus 140. Other advantages may exist.

Figure 5:
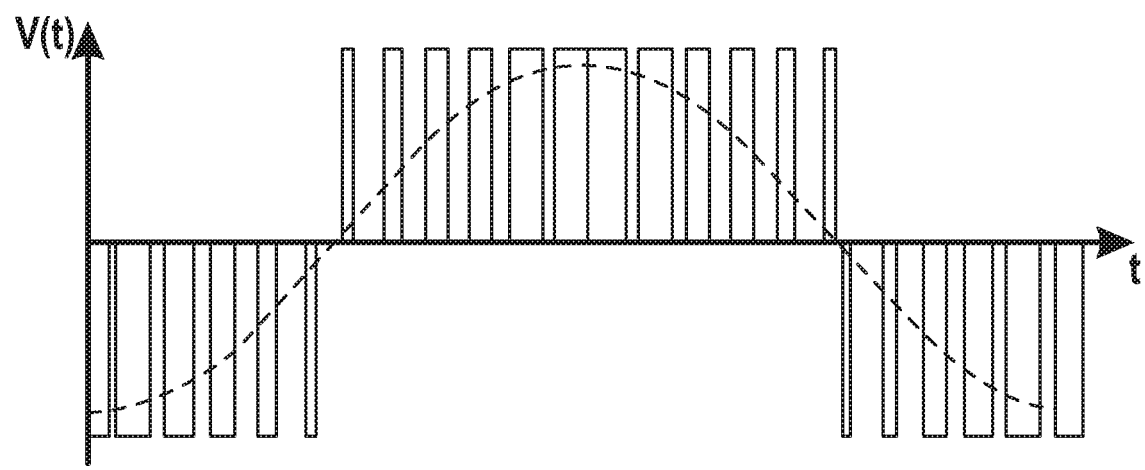
FIG. 5 is a chart depicting an embodiment of a single phase of a pulse width modulated excitation signal with a modulation component and a multiphase power signal component.

Referring to FIG. 5, an embodiment of a single phase of a high frequency excitation signal is depicted. As shown, the high frequency excitation signal may include a high frequency modulation component consisting of rectangular pulses. The high frequency excitation signal may further include a secondary modulated power signal encoded based on the duration, or width, of each of the rectangular pulses. The varying pulse-widths of the rectangular pulses may provide an average power that forms a sinusoidal signal, when the high frequency excitation signal is filtered, either through the use of a low pass filter, or based on inductances within a circuit. The inductance may be a leakage inductance from the second set of transformer windings 112 and the set of main field windings 120, or it may be a dedicated inductance separately inserted between the windings 112, 120. The energy carried within the excitation signal is represented by the sinusoidal line depicted in FIG. 5.

Figure 6:
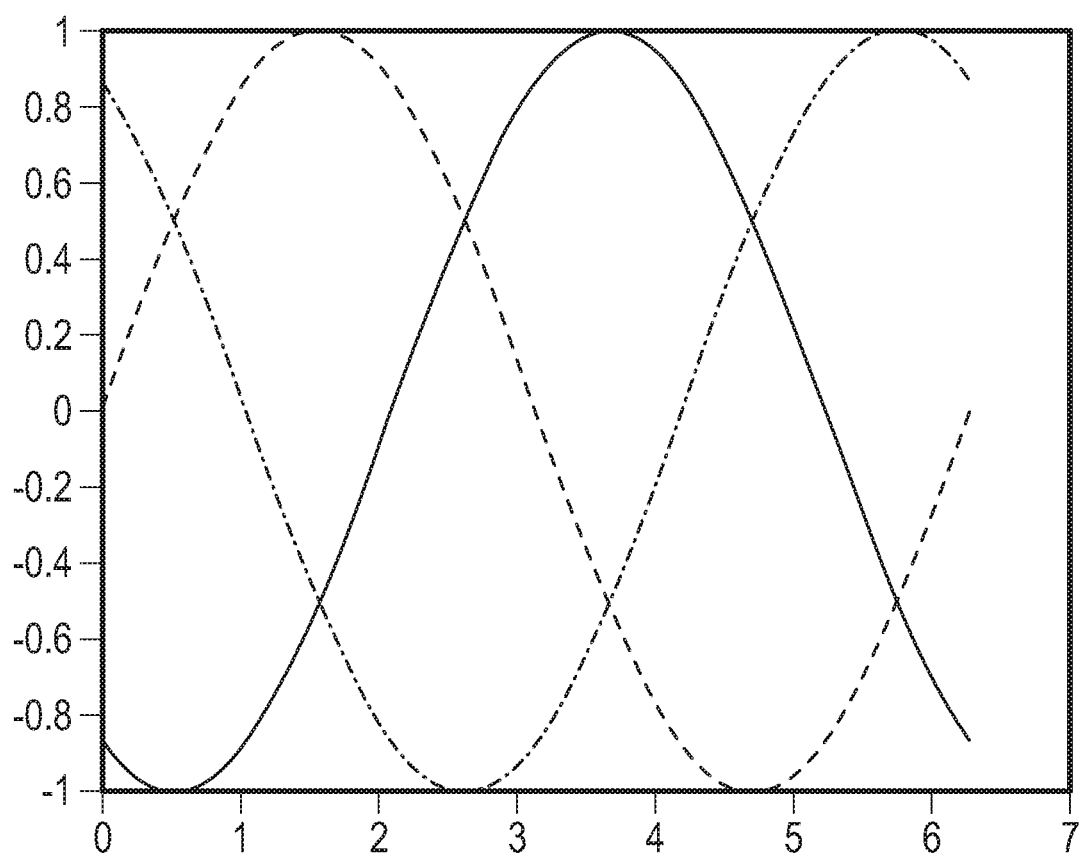
FIG. 6 is a chart depicting an embodiment of three phases of a low-pass filtered pulse width modulated excitation signal.

Referring to FIG. 6, three phases of a pulse-width modulated excitation signal (e.g., the signal depicted in FIG. 5) are depicted after having been filtered via a low-pass filter. As shown, when the excitation signal depicted in FIG. 5 is filtered, the high-frequency rectangular pulses are smoothed into a sinusoidal power phase. The multiphase signal depicted in FIG. 6 may be used to drive the set of main field windings 120 to generate the second rotating magnetic flux at the rotor 102.

Figure 7:
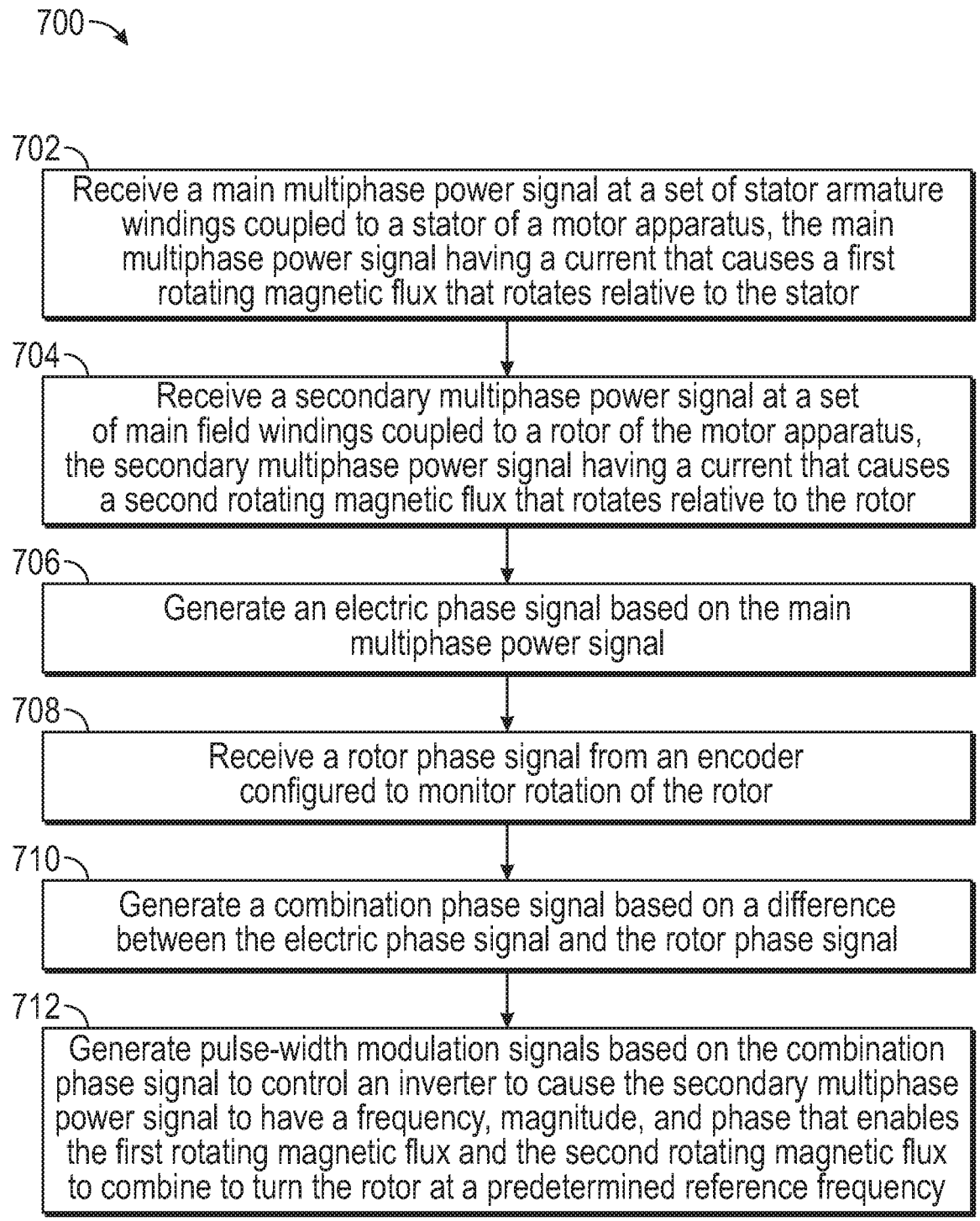
FIG. 7 is a flow chart depicting an embodiment of a method for variable frequency independent speed motor rotation.

Referring to FIG. 7, a method 700 is depicted. The method 700 may include receiving a main multiphase power signal at a set of main field windings coupled to a stator of a motor apparatus, the main multiphase power signal having a current that causes a first rotating magnetic flux that rotates relative to the stator, at 702.

The method 700 may further include receiving a secondary multiphase power signal at a set of stator armature windings coupled to a rotor of the motor apparatus, the secondary multiphase power signal having a current that causes a second rotating magnetic flux that rotates relative to the rotor, at 704.

The method 700 may also include generating an electric phase signal based on the main multiphase power signal, at 706.

The method 700 may include receiving a rotor phase signal from an encoder configured to monitor rotation of the rotor, at 708.

The method 700 may further include generating a combination phase signal based on a difference between the electric phase signal and the rotor phase signal, at 710.

The method 700 may also include generating pulse-width modulation signals based on the combination phase signal to control an inverter to cause the secondary multiphase power signal to have a frequency, magnitude, and phase that enables the first rotating magnetic flux and the second rotating magnetic flux to combine to turn the rotor at a predetermined reference frequency, at 712.

A benefit of the method 700 is that a motor may rotate at a speed that is independent of the frequency of an AC bus used to drive the motor. Further, the method 700 may be more efficient than typical induction motor methods that rely on rectification and modulation between a power bus and the input of a main stage. Other advantages of the method 700 may exist.

Although various embodiments have been shown and described, the present disclosure is not so limited and will be understood to include all such modifications and variations as would be apparent to one skilled in the art.

The invention claimed is:

1. An electric motor apparatus, comprising:
   a rotor;
   a stator;
   a high frequency transformer stage for transmitting an excitation signal from the stator to the rotor, the high frequency transformer stage having a first set of transformer windings positioned on the stator and a second set of transformer windings positioned on the rotor; and
   a main field motor stage having a set of stator armature windings positioned on the stator and a set of main field windings positioned on the rotor and coupled directly to the second set of transformer windings, wherein the set of stator armature windings is configured to receive a main multiphase power signal from an alternating current power bus having a first current that causes a first rotating magnetic flux that rotates relative to the stator, wherein the set of main field windings is configured to receive a secondary multiphase power signal from the second set of transformer windings, the secondary multiphase power signal having a second current that causes a second rotating magnetic flux that rotates relative to the rotor, wherein a combination of the first rotating magnetic flux and the second rotating magnetic flux causes the rotor to turn at a predetermined reference frequency, and wherein the excitation signal includes a high frequency modulation signal component and a secondary multiphase power component, and wherein an inductance at the second set of transformer windings and the set of main field windings filters the high frequency modulation signal component to form the secondary multiphase power signal.

2. The apparatus of claim 1, further comprising:
   a motor control unit including an inverter configured to generate the excitation signal based on pulse-width modulation signals.

3. The apparatus of claim 2, further comprising:
   an encoder, wherein the motor control unit is configured to:
      generate an electric phase signal based on the main multiphase power signal;
      receive a rotor phase signal from the encoder;
      generate a combination phase signal based on a difference between the electric phase signal and the rotor phase signal; and
      generate the pulse-width modulation signals based on the combination phase signal to control the inverter to generate the excitation signal.

4. The apparatus of claim 3, wherein the motor control unit is further configured to:
   receive a reference frequency signal from, the reference frequency signal representing the predetermined reference frequency;
   generate a Q-axis current signal based on the reference frequency signal and a rotor frequency signal;

generate a Q-axis voltage signal based on the Q-axis current signal and a Q-axis feedback current signal;
receive a D-axis reference current signal;
generate a D-axis current signal based on the D-axis reference current signal and a D-axis feedback current signal; and
generate an alpha-beta voltage signal by applying the combination phase signal in an inverse-Park transform using the Q-axis voltage signal and the D-axis current signal as inputs to the inverse-park transform, wherein the pulse-width modulation signals are derived from the alpha-beta voltage signal at a pulse-width modulation generator circuit.

5. The apparatus of claim 4, wherein the motor control unit is further configured to:
filter the excitation signal to retrieve a rotor feedback current signal;
generate an alpha-beta current feedback signal by applying a Clarke transformation using the rotor feedback current signal as an input to the Clark transformation; and
generate the D-axis feedback current signal and the Q-axis feedback current signal by applying the combination phase signal in a Park transformation using the alpha-beta current feedback signal as an input to the Park transformation.

6. The apparatus of claim 1, wherein the predetermined reference frequency of the rotor is independent from a frequency of the main multiphase power signal.

7. The apparatus of claim 1, wherein the first set of transformer windings, the second set of transformer windings, the set of main field windings, and the set of stator armature windings each include three windings for operation with 3-phase power signals.

8. The apparatus of claim 1, wherein a frequency of the excitation signal is between about 1 kHz to 1 MHz.

9. A system comprising:
a motor control unit including an inverter configured to generate an excitation signal having a high frequency modulation signal component and a secondary multiphase power component; and
a motor comprising:
a rotor;
a stator;
a high frequency transformer stage for transmitting the excitation signal from the stator to the rotor, the high frequency transformer stage having a first set of transformer windings positioned on the stator and a second set of transformer windings positioned on the rotor; and
a main motor stage having a set of stator armature windings positioned on the stator and a set of main field windings positioned on the rotor, wherein the set of stator armature windings is configured to receive a main multiphase power signal from an alternating current power bus having a current that causes a first rotating magnetic flux that rotates relative to the stator, wherein an inductance between the second set of transformer windings and the set of main field windings filters the high frequency modulation signal component to form a secondary multiphase power signal, and wherein the set of main field windings is configured to receive the secondary multiphase power signal, the secondary multiphase power signal having a current that causes a second rotating magnetic flux that rotates relative to the rotor, wherein a combination of the first rotating magnetic flux and the second rotating magnetic flux causes the rotor to turn at a predetermined reference frequency.

10. The system of claim 9, wherein the motor control unit comprises:
a rectifier configured to rectify the main multiphase power signal from the alternating current power bus to generate a direct current power signal;
a controller circuit; and
a frequency converter including the inverter, wherein the controller circuit is configured to control the frequency converter to modulate the direct current power signal to generate the excitation signal.

11. The system of claim 10, wherein the controller circuit is configured to:
generate an electric phase signal based on the main multiphase power signal;
receive a rotor phase signal from an encoder;
generate a combination phase signal based on a difference between the electric phase signal and the rotor phase signal; and
generate pulse-width modulation signals based on the combination phase signal to control the inverter to cause the secondary multiphase power signal to have a frequency, magnitude, and phase that enables the first rotating magnetic flux and the second rotating magnetic flux to combine to turn the rotor at the predetermined reference frequency.

12. The system of claim 11, wherein the controller circuit is further configured to: receive a reference frequency signal, the reference frequency signal representing the predetermined reference frequency;
generate a Q-axis current signal based on the reference frequency signal and a rotor frequency signal;
generate a Q-axis voltage signal based on the Q-axis current signal and a Q-axis feedback current signal;
receive a D-axis reference current signal;
generate a D-axis current signal based on the D-axis reference current signal and a D-axis feedback current signal; and
generate an alpha-beta voltage signal by applying the combination phase signal in an inverse-Park transform using the Q-axis voltage signal and the D-axis reference current signal as inputs to the inverse-park transform, wherein the pulse-width modulation signals are derived from the alpha-beta voltage signal.

13. The system of claim 12, wherein the controller circuit is further configured to:
filter the excitation signal to retrieve a rotor feedback current signal;
generate an alpha-beta current feedback signal by applying a Clarke transformation using the rotor feedback current signal as an input to the Clark transformation; and
generate the D-axis feedback current signal and the Q-axis feedback current signal by applying the combination phase signal in a Park transformation using the alpha-beta current feedback signal as an input to the Park transformation.

14. The system of claim 9, wherein the first set of transformer windings, the second set of transformer windings, the set of main field windings, and the set of stator armature windings each include three windings for operation with 3-phase power signals.

15. The system of claim 9, wherein a frequency of the excitation signal is between about 1 kHz to 1 MHz.

16. A method comprising:

receiving a main multiphase power signal at a set of stator armature windings coupled to a stator of a motor apparatus, the main multiphase power signal having a current that causes a first rotating magnetic flux that rotates relative to the stator;

transferring an excitation signal from the stator to a rotor using a high frequency transformer stage that includes a first set of transformer windings coupled to the stator and a second set of transformer windings coupled to the rotor, wherein the excitation signal includes a high frequency modulation signal component and a secondary multiphase power component;

receiving a secondary multiphase power signal at a set of main field windings coupled to the rotor of the motor apparatus and coupled directly to the second set of transformer windings, wherein an inductance between the second set of transformer windings and the set of main field windings filters the high frequency modulation signal component to form the secondary multiphase power signal, the secondary multiphase power signal having a current that causes a second rotating magnetic flux that rotates relative to the rotor;

generating an electric phase signal based on the main multiphase power signal;

receiving a rotor phase signal from an encoder configured to monitor rotation of the rotor;

generating a combination phase signal based on a difference between the electric phase signal and the rotor phase signal; and generating pulse-width modulation signals based on the combination phase signal to control an inverter to cause the secondary multiphase power signal to have a frequency, magnitude, and phase that enables the first rotating magnetic flux and the second rotating magnetic flux to combine to turn the rotor at a predetermined reference frequency.

17. The method of claim 16, wherein the predetermined reference frequency of the rotor is independent from a frequency of the main multiphase power signal.

18. The method of claim 16, further comprising:

receiving a reference frequency signal, the reference frequency signal representing the predetermined reference frequency;

generating a Q-axis current signal based on the reference frequency signal and a rotor frequency signal;

generating a Q-axis voltage signal based on the Q-axis current signal and a Q-axis feedback current signal;

receiving a D-axis reference current signal;

generating a D-axis current signal based on the D-axis reference current signal and a D-axis feedback current signal; and generating an alpha-beta voltage signal by applying the combination phase signal in an inverse-Park transform using the Q-axis voltage signal and the D-axis reference current signal as inputs to the inverse-park transform, wherein the pulse-width modulation signals are derived from the alpha-beta voltage signal.

19. The method of claim 18, further comprising:

filtering the excitation signal to retrieve a rotor feedback current signal;

generating an alpha-beta current feedback signal by applying a Clarke transformation using the rotor feedback current signal as an input to the Clark transformation; and generating the D-axis feedback current signal and the Q-axis feedback current signal by applying the combination phase signal in a Park transformation using the alpha-beta current feedback signal as an input to the Park transformation.

20. The method of claim 16, wherein a frequency of the excitation signal is between about 1 kHz to 1 MHz.

* * * * *